US009633268B1

(12) United States Patent
Ma et al.

(10) Patent No.: US 9,633,268 B1
(45) Date of Patent: Apr. 25, 2017

(54) METHOD AND DEVICE FOR GAIT RECOGNITION

(71) Applicant: BEIJING UNIVERSITY OF POSTS AND TELECOMMUNICATIONS, Beijing (CN)

(72) Inventors: Huadong Ma, Beijing (CN); Wu Liu, Beijing (CN); Huiyuan Fu, Beijing (CN); Cheng Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 15/016,882

(22) Filed: Feb. 5, 2016

(30) Foreign Application Priority Data

Dec. 18, 2015 (CN) .......................... 2015 1 0958380

(51) Int. Cl.
*G06K 9/62* (2006.01)
*G06K 9/00* (2006.01)
*G06K 9/66* (2006.01)
*G06K 9/52* (2006.01)

(52) U.S. Cl.
CPC ..... *G06K 9/00885* (2013.01); *G06K 9/00342* (2013.01); *G06K 9/00348* (2013.01); *G06K 9/52* (2013.01); *G06K 9/6215* (2013.01); *G06K 9/66* (2013.01)

(58) Field of Classification Search
CPC ............. G06K 9/00335–9/00355; A61B 5/112
See application file for complete search history.

(56) References Cited

U.S. PATENT DOCUMENTS

| | | | | |
|---|---|---|---|---|
| 2004/0228503 A1* | 11/2004 | Cutler | ................ | G06K 9/00348 382/103 |
| 2014/0270402 A1* | 9/2014 | Condell | ............. | G06K 9/00348 382/115 |

FOREIGN PATENT DOCUMENTS

CN  104281853 A * 1/2015 ......... G06K 9/00342

OTHER PUBLICATIONS

Ming Zeng et al., Convolutional Neural Networks for Human Activity Recognition using Mobile Sensors, 2014 6th International Conference on Mobile Computing, Applications and Services (MobiCASE), 2014, pp. 197-205.*
Jang-Hee Yoo, Automated Human Recognition by Gait using Neural Network, IEEE Image Processing Theory, Tools & Applications, 2008, 6 pages total.*
Heesung Lee et al., Neural network ensemble with probabilistic fusion and its application to gait recognition, Elsevier publication, Neurocomputing 72 (2009) 1557-1564.*

* cited by examiner

*Primary Examiner* — Brian P Werner
(74) *Attorney, Agent, or Firm* — Meunier Carlin & Curfman LLC

(57) ABSTRACT

Disclose is a gait recognition method, firstly, extracting an initial gait feature of a gait video of a person to be recognized; secondly obtaining a corresponding optimized gait feature according to a trained sub neural network and the initial gait feature; then determining corresponding degrees of similarity according to the optimized gait feature of the person to be recognized and the optimized gait feature of each known person in a matching library, and determining information of the person to be recognized according to information of the known person in the matching library corresponding to the optimized gait feature which has the highest degree of similarity with the optimized gait feature of the person to be recognized.

12 Claims, 3 Drawing Sheets

METHOD AND DEVICE FOR GAIT RECOGNITION

TECHNICAL FIELD

The present invention relates to the field of recognition technology, and particularly to a method and a device for gait recognition.

BACKGROUND

Gait recognition is a recognition technology based on biometrics, and is intended to identify a person according to the walking posture of the person. Gait is the walking posture of a person, comprising a regular movement trend and variations present at joints of the upper limbs and lower limbs during walking. By analyzing gait, identity and attribute, for example the information such as gender, age, race and the like, of a person to whom the gait belongs can be obtained. For the field of recognition technology, gait is biometrics of great potential, which mainly manifests in the following three aspects: 1) remotely accessible: surveillant can obtain gait information of a specific subject from a distance, and collect it secretly in a contactless manner, while the biometrics such as iris, fingerprint are collected with the need of a person's cooperation, which is very important in intelligent video surveillance; 2) robustness: even in low resolution videos, a gait feature still works well, and in contrast, an accurate face recognition and vocal print recognition impose relatively high requirements on the quality of data resources; 3) security: it is difficult to imitate or camouflage human gait, and if a person changes his/her gait in public deliberately, he/she would become more suspicious and gain attention. Gait recognition technology has become an important research direction in the computer vision and pattern recognition.

However, accurate gait recognition technology is not yet mature at present and there is still a huge challenge on how to perform accurate identity recognition by gait analysis. In the existing research field, gait recognition technology can be generally divided into two kinds: a model-based method and an appearance-based method. The model-based method performs matching by extracting human body structural features from a gait sequence, which imposes higher requirements on resolution of the collected images and is accompanied by complicated computation at the same time. The appearance-based method is suitable for gait recognition in outdoor applications and imposes fewer requirements on the resolution of the collected images. However, it is a big challenge on how to select discriminative feature. Nonetheless, it is difficult to extract an accurate gait feature from traditional hand-crafted gait features and to break the bottleneck of existing gait recognition technology.

Since gait recognition may be effected by factors such as viewpoints, clothing, belongings, walking speed, it causes too small inter-class differences between different persons and too large intra-class differences of a same person in different scenes for the gait feature for judging and recognizing in the prior art, and thus results in inaccurate recognition in the end.

SUMMARY

Embodiments of the present invention disclose a method and a device for gait recognition, which is used to solve the problem of the resulting inaccurate recognition due to too small inter-class differences between different persons and too large intra-class differences of a same person in different scenes for the gait feature for judging and recognizing. The technical solutions are as follows:

A gait recognition method, the method comprises:

S11: extracting an initial gait feature of a gait video of a person to be recognized;

S12: obtaining a corresponding optimized gait feature according to a trained sub neural network and the initial gait feature;

S13: determining corresponding degrees of similarity according to the optimized gait feature of the person to be recognized and the optimized gait feature of each known person in a matching library, and determining information of the person to be recognized according to information of the known person in the matching library corresponding to the optimized gait feature which has the highest degree of similarity with the optimized gait feature of the person to be recognized;

wherein, the trained sub neural network is obtained by:

S21: for each known person, obtaining an initial gait feature of a gait video of the person;

S22: constructing a sample pair set, which comprises a first sample pair group and a second sample pair group, wherein each sample pair of the first sample pair group includes two initial gait features of a same person and each sample pair of the second sample pair group includes two initial gait features of different persons;

S23: training a neural network comprising two identical sub neural networks which are provided in parallel and share weight according to the first sample pair group and the second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group.

Preferably, determining information of the person to be recognized according to information of the known person in the matching library corresponding to the optimized gait feature which has the highest degree of similarity with the optimized gait feature of the person to be recognized comprises:

with the highest degree of similarity, judging whether the highest degree of similarity is greater than a preset threshold of the degree of similarity, and if so, determining the information of the known person in the matching library corresponding to the optimized gait feature which has the highest degree of similarity with the optimized gait feature of the person to be recognized as the information of the person to be recognized.

Preferably, the outputs of the two sub neural networks for all the sample pairs converge to a contrastive loss layer;

each sub neural network is trained according to a contrastive loss function set for the contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group.

Preferably, the contrastive loss function is:

$$\mathcal{L}(W) = \sum_{i=1}^{P} L(W, (y, X_1, X_2)^i) \text{ wherein,}$$

$$L(W, (y, X_1, X_2)^i) = (1-y) \cdot \max(m - E_W(X_1, X_2)^i, 0) + y \cdot E_W(X_1, X_2)^i E_W(X_1, X_2) = \|S_W(X_1) - S_W(X_2)\|_2^2$$

i represents the ith sample pair, $X_1$, $X_2$ are two initial gait features in a sample pair respectively; when the ith sample pair belongs to the first sample pair group, y equals to 1; when the ith sample pair belongs to the second sample pair group, y equals to 0; P is the total number of the sample pairs, W is a model parameter of the sub neural network, m is a boundary threshold which is set to be greater than 0, $S_W(X_1), S_W(X_2)$ are optimized gait features corresponding to the initial gait features $X_1$, $X_2$.

Preferably, the sub neural network is a 3D convolutional neural network.

Preferably, extracting an initial gait feature of a gait video of a person to be recognized comprises:

for an image sequence of the gait video, extracting a foreground silhouette image sequence using a Graph Cut image segmentation method;

normalizing sizes of images in the foreground silhouette image sequence and using the normalized foreground silhouette image sequence as the initial gait feature.

Preferably, the number of the sample pairs comprised in the first sample pair group is equal to that of the sample pairs comprised in the second sample pair group.

According to another aspect of the present invention, a gait recognition device is proposed, which comprises:

an extracting module used to extract an initial gait feature of a gait video of a person to be recognized;

a generating module used to obtain a corresponding optimized gait feature according to a trained sub neural network and the initial gait feature;

a recognizing module used to determine corresponding degrees of similarity according to the optimized gait feature of the person to be recognized and the optimized gait feature of each known person in a matching library, and to determine information of the person to be recognized according to information of the known person in the matching library corresponding to the optimized gait feature which has the highest degree of similarity with the optimized gait feature of the person to be recognized;

the device further comprises:

a training module used to obtain an initial gait feature of a gait video of each known person; to construct a sample pair set, which comprises a first sample pair group and a second sample pair group, wherein each sample pair of the first sample pair group includes two initial gait features of a same person and each sample pair of the second sample pair group includes two initial gait features of different persons; and to train a neural network comprising two identical sub neural networks which are provided in parallel and share weight according to the first sample pair group and the second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group.

Preferably, the recognizing module is specifically used to judge whether the highest degree of similarity is greater than a preset threshold of the degree of similarity, and if so, to determine the information of the known person in the matching library corresponding to the optimized gait feature which has the highest degree of similarity with the optimized gait feature of the person to be recognized as the information of the person to be recognized.

Preferably, the training module is specifically used to train each sub neural network according to a contrastive loss function set for a contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group. The contrastive loss function is:

$$\mathcal{L}(W) = \sum_{i=1}^{P} L(W, (y, X_1, X_2)^i)$$

wherein, $L(W,(y,X_1,X_2)^i) = (1-y) \cdot \max(m - E_W(X_1,X_2)^i, 0) + y \cdot E_W(X_1,X_2)^i E_W(X_1,X_2) = \|S_W(X_1) - S_W(X_2)\|_2^2$ i represents the ith sample pair, $X_1$, $X_2$ are two initial gait feature in a sample pair respectively; when the ith sample pair belongs to the first sample pair group, y equals to 1; when the ith sample pair belongs to the second sample pair group, y equals to 0; P is the total number of the sample pairs, W is a model parameter of this sub neural network, m is a boundary threshold which is set to be greater than 0, $S_W(X_1), S_W(X_2)$ are optimized gait features corresponding to the initial gait features $X_1$, $X_2$.

Beneficial Effects:

Embodiments of the present invention provide a method and a device for gait recognition. The method comprises: constructing a neural network comprising two identical sub neural networks which are provided in parallel and share weight, training the neural network with a first sample pair group and a second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group; when performing gait feature recognition, extracting an initial gait feature of a gait video of a person to be recognized; obtaining a corresponding optimized gait feature according to a trained sub neural network and the initial gait feature; determining corresponding degrees of similarity according to the optimized gait feature of the person to be recognized and the optimized gait feature of each known person in a matching library, and determining information of the person to be recognized according to information of the known person in the matching library corresponding to the optimized gait feature which has the highest degree of similarity with the optimized gait feature of the person to be recognized. Since the sub neural networks have the capability of extracting optimized gait features that are more discriminative, the recognition results are more accurate.

Certainly, any product or method implementing the present invention does not necessarily achieve all of the advantages described above simultaneously.

BRIEF DESCRIPTION OF THE DRAWINGS

In order to describe the embodiments of the present invention or technical solutions in the prior art more clearly, appended drawings required for describing the embodiments or the prior art will be briefly described below. Obviously, the appended drawings described below are only some embodiments of the present invention, and those with ordinary skills in the art can also obtain other drawings based on these drawings without doing creative works.

DETAILED DESCRIPTION

Technical solutions in the embodiments of the present invention will be described below clearly and completely in combination with the appended drawings for the embodiments of the present invention. Obviously, the described embodiments are only some of the embodiments of the present invention, rather than all of them. Any other embodiment obtained based on the embodiments of the present invention by those skilled in the art without doing creative works falls into the protection scope of the present invention.

The present invention provides a gait recognition method, wherein a further optimized gait feature is obtained by processing a 3D gait video of a person to be recognized, and by comparing it with the optimized gait features of a known person in a matching library, the method realizes recognition in the end.

Figure 1:
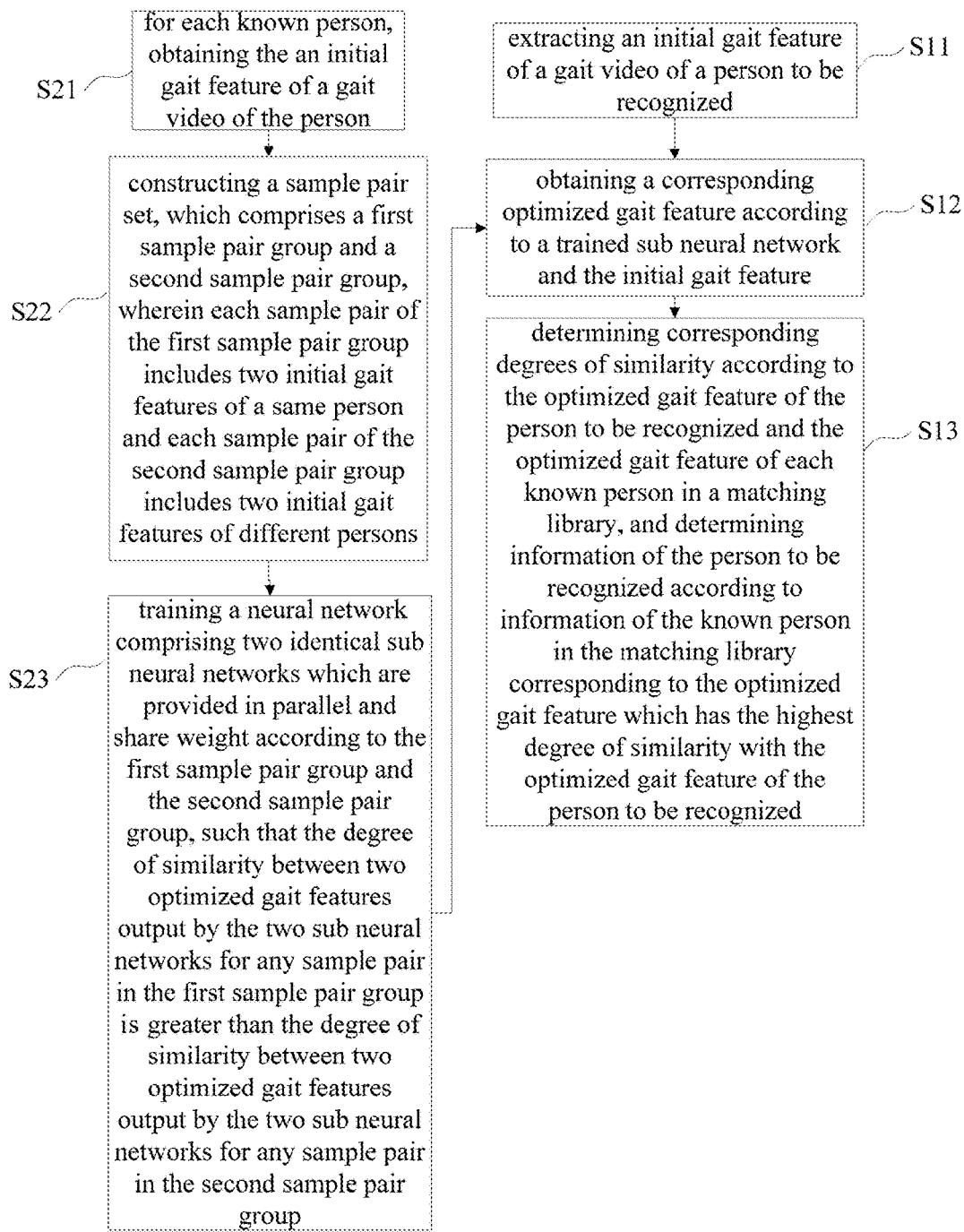
FIG. 1 is a flowchart of a gait recognition method provided by an embodiment of the present invention.

Refer to FIG. 1, which shows a flowchart of gait recognition provided by an embodiment of the present invention, the gait recognition method is illustrated in the flowchart. The method specifically comprises:

S11: extracting an initial gait feature of a gait video of a person to be recognized.

In general application, a gait video of the person to be recognized is obtained. In this step, it is necessary to first process the gait video to obtain a useful initial gait feature.

S12: obtaining a corresponding optimized gait feature according to a trained sub neural network and the initial gait feature extracted in step S11.

In this step, the initial gait feature extracted in step S11 is input into a sub neural network, the output of which is a corresponding optimized gait feature. A forward propagation algorithm is used by the sub neural network to extract the optimized gait feature.

S13: determining corresponding degrees of similarity according to the optimized gait feature of the person to be recognized and the optimized gait feature of each known person in a matching library, and determining information of the person to be recognized according to information of the known person in the matching library corresponding to the optimized gait feature which has the highest degree of similarity with the optimized gait feature of the person to be recognized.

In this embodiment, the k-Nearest Neighbor algorithm can be used to calculate the degree of similarity between the optimized gait feature of the person to be recognized and the optimized gait feature of each known person in the matching library. The information of the person to be recognized can by determined according to the information of the known person in the matching library corresponding to the optimized gait features which has the highest degree of similarity with the optimized gait feature of the person to be recognized. Here, the information of this known person comprises one or more of the information such as name, gender, age, company and the like.

In another embodiment, in order to identify the person to be recognized more accurately, with the highest degree of similarity, judge whether the highest degree of similarity is greater than a preset threshold of the degree of similarity, and if so, determine the information of the known person in the matching library corresponding to the optimized gait feature which has the highest degree of similarity with the optimized gait feature of the person to be recognized as the information of the person to be recognized; if not, it can be considered that there is no optimized gait feature belonging to the same person as the person to be recognized stored in the matching library, and then the optimized gait feature of this person can be stored and various information of him/her can be registered. Certainly, it can be considered that the recognition fails.

In this embodiment, the optimized gait features of the known persons are pre-stored in the matching library, which are extracted by a trained sub neural network in the embodiments of the present invention. In other embodiments, gait videos and initial gait features of the known persons can also be pre-stored in the matching library. In this case, during the first recognition or before identifying the person to be recognized, corresponding optimized gait features can be obtained according to the obtained initial gait features of the gait videos of the known persons and the trained sub neural network, and can be stored in the matching library. When performing the next recognition, S11-S13 can be performed directly.

In a case where gait videos or initial gait features of the known persons are pre-stored in the matching library, and when judging whether the highest degree of similarity is greater than the preset threshold of the degree of similarity so as to determine the information of the person to be recognized, if the highest degree of similarity is smaller than the preset threshold of the degree of similarity, it can also be considered that there is no initial gait feature or gait video belonging to the same person as the person to be recognized stored in the matching library, and then the optimized gait feature, initial gait feature or gait video of this person can be stored and various information of him/her can be registered.

In order to perform a quick recognition, any two optimized gait features in the matching library belong to different persons respectively, or gait videos in the matching library of any two known persons belong to different persons, or any two initial gait features in the matching library belong to different persons respectively, which can ensure the degree of similarity not to be calculated repeatedly, thereby increase the recognition speed.

In the embodiments of the present invention, the neural network comprises two sub neural networks which can be trained such that the degree of similarity between two optimized gait features output by the two sub neural networks for any sample pair in the first sample pair group is greater than the degree of similarity between two optimized gait features output by the two sub neural networks for any sample pair in the second sample pair group, wherein each sample pair in the first sample pair group includes two initial gait features belonging to a same person, while each sample pair in the second sample pair group includes two initial gait features belonging to different persons.

Figure 2:
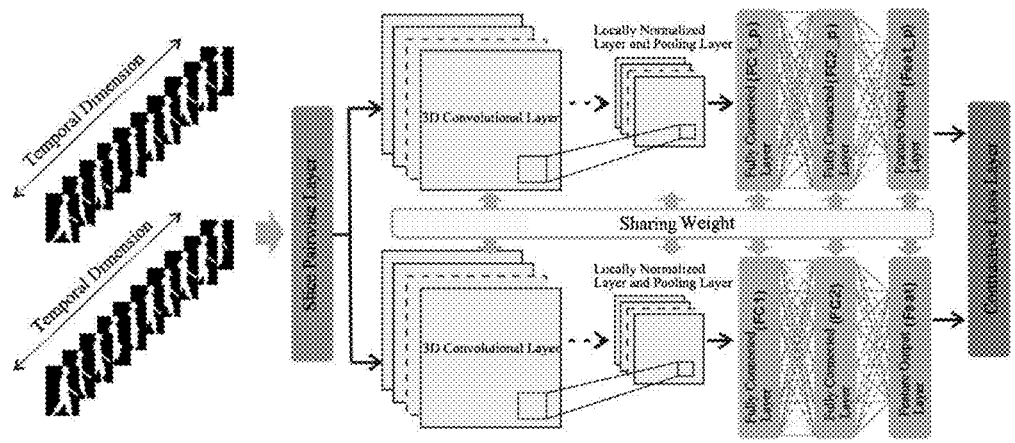
FIG. 2 is a flowchart of a neural network algorithm provided by an embodiment of the present invention.

The training steps of the sub neural networks used in the recognition steps are illustrated in FIG. 1, which is a flowchart of the gait recognition and illustrates the training steps of the sub neural networks used in the recognition steps. As shown in FIG. 2, the neural network used during training comprises two sub neural networks which are provided in parallel and share weight. The step of obtaining the trained sub neural networks specifically comprises:

S21: for each known person, obtaining an initial gait feature of a gait video of the person.

In this step, any gait video can be used as long as it belongs to a known person, but in actual application it can be determined according to actual situations. For example, if the gait recognition is to identify a person in a surveillance area, the gait video of a known person who appears often in the surveillance area can be selected and processed to extract the initial gait feature, making the surveillance more convenient.

S22: constructing a sample pair set, which comprises a first sample pair group and a second sample pair group, wherein each sample pair of the first sample pair group includes two initial gait features of a same person and each sample pair of the second sample pair group includes two initial gait features of different persons.

With the initial gait features of known persons obtained in step S21, the initial gait features of any two known persons are selected as a sample pair, and these sample pairs are organized in groups. If the two initial gait features in a sample pair belong to the same person, this sample pair is classified into the first sample pair group; if the two initial gait features in a sample pair belong to two different persons, this sample pair is classified into the second sample pair group.

According to the manner for storing data of the sample pairs, the manner for inputting the data into the two sub neural networks is determined. For example, if the two initial gait features in a sample pair are stored separately, the two initial gait features in the sample pair can be directly input into the two sub neural networks respectively; if the two initial gait features in a sample pair are stored together, the data can be sliced to obtain the two initial gait features and then these features can be input into the two sub neural network respectively.

Further, the number of the sample pairs comprised in the first sample pair group and the second sample pair group can be any. Specifically, the ratio of the number of the sample pairs contained in the first sample pair group to that of the sample pairs contained in the second sample pair group can be set to be equal to a preset value and it can be ensured that there are a certain number of the two kinds of sample pairs by controlling the preset value. Furthermore, the preset value is set to be 1 to ensure the equal number of the two kinds of sample pairs.

By way of an example, there are 3000 gait videos of known persons, and according to the information of a known person recorded in each gait video, the gait video has been marked with the information of the known person. These gait videos comprise not only the gait videos belonging to a same person from different viewpoints, e.g. viewpoints of 55, 65, 75, 85 degree etc., but also the gait videos of different persons. After extracting the initial gait feature of a gait video, since the number of the sample pairs from which two initial gait features of a same person can be selected is much smaller than the number of the sample pairs from which two initial gait features of different persons can be selected, if the selection is random, the number of the sample pairs contained in the first sample pair group may be much smaller than that of the sample pairs contained in the second sample pair group, and thereby the accuracy of training cannot be ensured. Therefore, it is necessary to set the preset value and the preset value is set to 1 to ensure the equal number of the two kinds of sample pairs, which can thereby ensure that accurate and reliable sub neural networks can be obtained by training.

S23: training a neural network comprising two identical sub neural networks which are provided in parallel and share weight according to the first sample pair group and the second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group.

By training and learning, these two sub neural networks both have the capability of obtaining optimized gait features that are more discriminative, i.e., such that the degree of similarity between two optimized gait features of a same person obtained by either or both of the two sub neural networks is greater than the degree of similarity between two optimized gait features of different persons obtained by either or both of the two sub neural networks. By sharing weight, the two sub neural networks can both have the capability of obtaining the optimized gait features that are more discriminative, thereby increasing the discriminability and increasing the accuracy of recognition when identifying a person to be recognized.

In order to perform step S23 better, when training the two sub neural networks, the following manner can be used: converging the outputs of the two sub neural networks for all the sample pairs into a contrastive loss layer;

training each sub neural network according to a contrastive loss function set for the contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group.

Generally, the contrastive loss value of an objective function can be calculated by the contrastive loss function and controlled by the threshold of the loss function so as to obtain the objective function that meets requirements.

In this embodiment, the contrastive loss function is:

$$\mathcal{L}(W) = \sum_{i=1}^{P} L(W, (y, X_1, X_2)^i) \text{ wherein,}$$

$$L(W, (y, X_1, X_2)^i) = (1-y) \cdot \max(m - E_W(X_1, X_2)^i, 0) +$$
$$y \cdot E_W(X_1, X_2)^i E_W(X_1, X_2) = \|S_W(X_1) - S_W(X_2)\|_2^2$$

i represents the ith sample pair, $X_1$, $X_2$ are two initial gait features in a sample pair respectively; when the ith sample pair belongs to the first sample pair group, y equals to 1; when the ith sample pair belongs to the second sample pair group, y equals to 0; P is the total number of the sample pairs, W is a model parameter of the sub neural network, m is a boundary threshold which is set to be greater than 0, $S_W(X_1), S_W(X_2)$ are optimized gait features corresponding to the initial gait features $X_1$, $X_2$. $S_W(X_i)$ is the optimized gait feature output by the first sub neural network after the initial gait feature $X_1$ is input. $S_W(X_2)$ is the optimized gait feature output by the second sub neural network after the initial gait feature $X_2$ is input. $E_W(X_1, X_2)$ is the similarity metric between $S_W(X_1)$ and $S_W(X_2)$.

In this embodiment, the contrastive loss function is 0 and the two sub neural networks in the neural network are trained by the back-tracking algorithm. During training, the model parameters corresponding to respective sub neural network are initialized, and iteration is performed. An approximate solution is obtained when the contrastive loss function equals to 0 using a gradient descent method and the model parameters corresponding to respective sub neural network are tuned such that the models of the respective sub neural network are converged, thereby achieving the purpose of training the neural network. By the contrastive loss function, it can be ensured that the similarity metric between the two optimized gait features of a same person output by a trained sub neural network is close to 0, while the similarity metric between the two optimized gait features of different persons is close to the boundary threshold m. The greater the similarity metric is, the smaller the degree of similarity between the two optimized gait features is, and the smaller the similarity metric is, the greater the degree of similarity between the two optimized gait features is. Thus it ensures that the degree of similarity between the two optimized gait features is calculated according to the optimized gait features extracted by the sub neural network, and according to the degree of similarity, the optimized gait features in pairs are accurately classified into two kinds, the one belonging to a same person and the one belonging to different persons.

In addition, it is noted that the process for training a neural network according to the contrastive loss function belongs to the prior art and thus the specific training process will not be described in detail in the embodiments of the present invention. It is believed that those skilled in the art can train a neural network according to the implementation manner provided in the embodiments of the present invention, such that the degree of similarity between two optimized gait features output by the sub neural networks for any sample pair in the first sample pair group is greater than that between two optimized gait features output by the sub neural networks for any sample pair in the second sample pair group.

In order to accurately identify the information of the person to be recognized, in one embodiment of the present invention, the two sub neural networks are 3D convolutional neural networks. Certainly, common neural networks or 2D convolutional neural networks can also be used. Compared to common neural networks, the 2D convolutional neural networks and the 3D convolutional neural networks are deep learning neural networks and can extract optimized gait features that are more discriminative. Compared to 2D convolutional neural networks, 3D convolutional neural networks are time and space based, which have more advantages in gait feature representation. Therefore, using 3D convolutional neural networks as the two sub neural networks is a better choice.

Refer to FIG. 2, which is a flowchart of a neural network algorithm provided by an embodiment of the present invention, wherein 3D convolutional neural networks are used as the sub neural networks. The 3D convolutional neural network comprise 3D convolutional layers, locally normalized layers and pooling layers, fully connected layer, feature output layers. As can be seen in FIG. 2, the input of the 3D convolutional neural network are time-based gait silhouette image sequences, and when the 3D convolutional neural networks are used as the sub neural networks, the initial gait features used are a time-based gait silhouette sequence.

Figure 4:
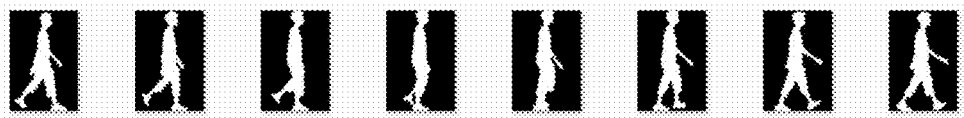
FIG. 4 is a gait silhouette sequence provided by an embodiment of the present invention.

The gait silhouette sequence also has spatiality. Referring to FIG. 4, the gait silhouette image sequence illustrated in FIG. 4 can embody the temporality and spatiality and it is walking posture silhouettes during a period. In this case, in one embodiment of the present invention, extracting an initial gait feature of a gait video of a person to be recognized comprises:

for an image sequence of the gait video, extracting a foreground silhouette image sequence using a Graph Cut image segmentation method;

normalizing sizes of images in the foreground silhouette image sequence and using the normalized foreground silhouette image sequence as the initial gait feature.

The method for extracting an initial gait feature of a person to be recognized described above can be used for obtaining initial gait features of gait videos of other persons.

Specifically, a gait video comprises a plurality of frames, and the plurality of frames can constitute an image sequence comprising the initial gait feature. The Graph Cut image segmentation method is used to extract the foreground silhouette image sequence from a gait video, and the images in the foreground silhouette image sequence is zoomed in/out to be normalized into a uniform dimension, thus forming a time-based gait silhouette image sequence. The normalized foreground silhouette image sequence is used as the initial gait feature.

When normalizing the foreground silhouette image sequence, the sizes of the images in the foreground silhouette image sequence are normalized into a uniform size. For example, the foreground silhouette image sequence can be normalized into a certain resolution such as 128×171.

Figure 3:
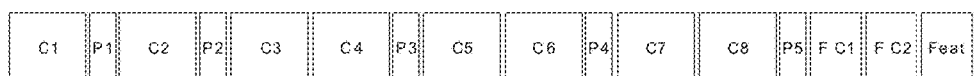
FIG. 3 is the architecture of a 3D convolutional neural network provided by an embodiment of the present invention.

By way of an example, refer to FIG. 3, which is a schematic diagram of network architecture of the 3D convolutional neural network, and which are the specific configurations of the 3D convolutional layers, locally normalized layers and pooling layers, fully connected layers, feature output layers of the 3D convolutional neural network. In an embodiment of the present invention, the 3D convolutional neural network is provided with 8 convolutional layers, 5 max-pooling layers, 2 fully connected layers and one feature output layer, wherein the max-pooling layers correspond to the locally normalized layer and pooling layer. Here, the convolutional layers are respectively C1, C2, C3, C4, C5, C6, C7, C8, the pooling layers are respectively P1, P2, P3, P4, P5, and the output layer is Feat. Additionally, in order to realize the connection between the pooling layers and the output layer, the 3D convolutional neural network is further provided with 2 fully connected layers, which are FC1, FC2 respectively. The size of the convolution kernel in each layer, output dimension and scanning step length are specifically seen in the following table:

| network layer | convolution kernel (d × k × k) | output dimension | scanning step length |
|---|---|---|---|
| C1 | 3 × 3 × 3 | 64 | 1 |
| C2 | 3 × 3 × 3 | 128 | 1 |
| C3 | 3 × 3 × 3 | 256 | 1 |
| C4 | 3 × 3 × 3 | 256 | 1 |
| C5 | 3 × 3 × 3 | 512 | 1 |
| C6 | 3 × 3 × 3 | 512 | 1 |
| C7 | 3 × 3 × 3 | 512 | 1 |
| C8 | 3 × 3 × 3 | 512 | 1 |
| P1 | 1 × 2 × 2 | — | 2 |
| P2 | 2 × 2 × 2 | — | 2 |
| P3 | 2 × 2 × 2 | — | 2 |
| P4 | 2 × 2 × 2 | — | 2 |
| P5 | 2 × 2 × 2 | — | 2 |
| FC1 | — | 4096 | — |
| FC2 | — | 4096 | — |
| Feat | — | 2 | — |

Wherein, the size of the convolution kernel is d×k×k, d is the depth of the time kernel, k is the size of the space kernel and the scanning step length is the pixel size by which the convolution kernel moves once in the image.

The optimized gait feature can be represented by the feature vector with high dimensionality output by the FC2 layer, and can also be represented by the feature vector with low dimensionality output by the feat layer.

In the recognition method proposed by the present invention, the time-based gait silhouette sequence of a person is used as the input of the 3D convolutional neural network, which takes the advantage of the periodic feature of gait more effectively and in the meantime creatively parallelizes the 3D convolutional neural networks by a weight sharing mechanism, sufficiently digs the advantages and relation of the two, and fine-tunes the model parameter with contrastive loss function and finally uses the K-Nearest Neighbor algorithm to calculate the degree of similarity between the optimized gait features. The present invention can overcome the domain gap between the classification model and the gait recognition issues in the current deep learning method and can take advantage of the periodic model of gait to perform feature representation for a gait sequence. Therefore, the accuracy of gait recognition can be increased and the gait recognition effect with a high precision is achieved, which provides a solid technology support for the application of gait recognition.

Therefore, compared to the prevalent gait recognition methods, this method has various advantages:

the embodiments of the present invention provide a gait recognition method, the method comprises: constructing a neural network comprising two identical sub neural networks which are provided in parallel and share weight, training the neural network with a first sample pair group and a second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group; when performing the gait feature recognition, extracting an initial gait feature of a gait video of a person to be recognized; obtaining a corresponding optimized gait feature according to a trained sub neural network and the initial gait feature of the person to be recognized; determining corresponding degrees of similarity according to the optimized gait feature of the person to be recognized and the optimized gait feature of each known person in a matching library, and determining the information of the person to be recognized according to the information of the known person in the matching library corresponding to the optimized gait feature which has the highest degree of similarity with the optimized gait feature of the person to be recognized. Since the sub neural network has the capability of extracting optimized gait features that are relatively discriminative, the recognition results are more accurate.

Compared to traditional hand-crafted based gait recognition methods, the present invention proposes a gait recognition method that is deep learning based, which is specifically a gait recognition method that bases on deep convolutional neural network. The deep learning method can extract gait features that are more discriminative, thereby overcoming the bottleneck of existing feature representation.

Compared to gait recognition methods that are based on the 2D convolutional neural network, the method proposed by the present invention uses a 3D convolutional neural network to extract gait features. Gait is a motion feature with two dimensions of space and time. Periodicity is the most significant difference between gait recognition and traditional image recognition. Although a traditional 2D convolutional neural network has the ability of extracting abundant and discriminative features, it is limited by the input images of 2D space. The application of the 2D convolutional neural network to the gait recognition issue requires a complicatedly designed gait energy diagram as input, and the input gait energy diagram may be accompanied with losses of the temporal-spatial gait information. The inaccuracy of the input information may result in the inaccuracy of output results and thus the accuracy of recognition cannot be increased more effectively. The 3D convolutional neural network assembles a cube by stacking a plurality of successive frames, and then extracts a feature map using 3D convolution kernel from the cube. In such architecture, each feature map in the convolutional layer is connected with a plurality of adjacent successive frames in the upper layer, whereby motion information is captured. The 3D convolutional neural network is initially proposed for motion recognition, and by extracting optimized gait features that are more discriminative from dimensions of space and time, the 3D convolutional neural network can overcome the bottleneck of existing feature representation and thereby increase the accuracy of recognition.

Currently most deep learning models are mainly used in large-scale object classification issues. Object classification assignments require answering whether a certain object is comprised in an image. However, from the pattern classification's point of view, there is a huge domain gap between gait recognition issues and classification issues, which often results in a failure to obtain ideal recognition results by applying traditional classification convolutional network to the gait recognition issues directly. For these problems, the present invention creatively introduces parallel convolutional neural networks to overcome the domain gap between the classification and recognition issues. The parallel neural network architecture consists of two parallel convolutional neural networks, with each layer of the network sharing weight. One just needs to input an initial gait feature of a same person and initial gait features of different persons to perform training. The main idea is to map the input pattern into a latent semantic space by learning one contrastive loss function. Specifically to the gait recognition issues, the similarity metric of the optimized gait features of a same person is reduced while the similarity metric of the optimized gait features of different walkers is increased. Such a parallel convolutional architecture is very advantageous in feature recognition and matching.

Figure 5:
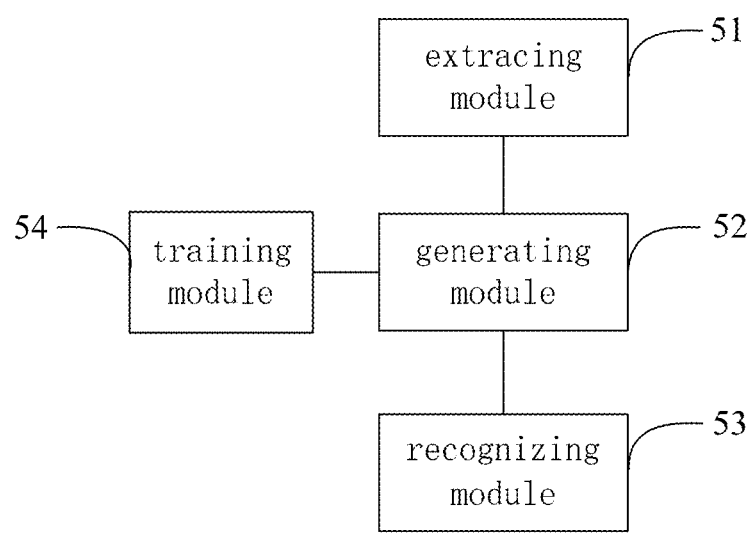
FIG. 5 is a schematic structural diagram of a gait recognition device provided by an embodiment of the present invention.

FIG. 5 is a schematic structural diagram of the gait recognition device provided by an embodiment of the present invention, the device comprising.

an extracting module 51 used to extract an initial gait feature of a gait video of a person to be recognized;

a generating module 52 used to obtain a corresponding optimized gait feature according to a trained sub neural network and the initial gait feature;

a recognizing module 53 used to determine corresponding degrees of similarity according to the optimized gait feature of the person to be recognized and the optimized gait feature of each known person in a matching library, and to determine the information of the person to be recognized according to the information of the known person in the matching library corresponding to the optimized gait feature which has the highest degree of similarity with the optimized gait feature of the person to be recognized.

The device further comprises:

a training module 54 used to obtain an initial gait feature of a gait video of each known person; to construct a sample pair set, which comprises a first sample pair group and a second sample pair group, wherein each sample pair of the first sample pair group includes two initial gait features of a same person and each sample pair of the second sample pair group includes two initial gait features of different persons; and to train a neural network comprising two identical sub neural networks which are provided in parallel and share weight according to the first sample pair group and the second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group.

The above-mentioned recognizing module 53 is specifically used to judge whether the highest degree of similarity is greater than a preset threshold of the degree of similarity, and if so, to determine the information of the known person in the matching library corresponding to the optimized gait feature which has the highest degree of similarity with the optimized gait feature of the person to be recognized as the information of the person to be recognized.

The training module 54 is specifically used to train each sub neural network according to a contrastive loss function set for a contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group, the contrastive loss function is:

$$\mathcal{L}(W) = \sum_{i=1}^{P} L(W, (y, X_1, X_2)^i)$$

wherein, $L(W,(y,X_1,X_2)^i) = (1-y)\cdot\max(m - E_W(X_1,X_2)^i, 0) + y\cdot E_W(X_1,X_2)^i E_W(X_1,X_2) = \|S_W(X_1) - S_W(X_2)\|_2^2$ i represents the ith sample pair, $X_1$, $X_2$ are two initial gait feature in a sample pair respectively; when the ith sample pair belongs to the first sample pair group, y equals to 1; when the ith sample pair belongs to the second sample pair group, y equals to 0; P is the total number of the sample pairs, W is a model parameter of the sub neural network, m is a boundary threshold which is set to be greater than 0, $S_W(X_1), S_W(X_2)$ are optimized gait features corresponding to the initial gait features $X_1$, $X_2$.

The embodiments of the present invention provide a gait recognition device. Since the device is proposed based on the above-mentioned recognition method, thus it can realize relatively more accurate recognition results as the above recognition method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

Various embodiments in the description are all described in a corresponding manner, Reference to each other can be made for the same or similar parts between various embodiments and the description of each embodiment focuses on the differences between them. In particular, the description of the embodiments of a system is quite brief since the embodiments of a system are essentially similar with the embodiments of a method, and reference can be made to the parts in the description of the embodiments of method.

It will be understood by one of ordinary skills in the art that all or part of the steps in the embodiments which implement the method described above can be implemented by instructing the related hardware with programs which can be stored in a computer readable storage medium such as ROM/RAM, magnetic disk, optical disk or the like.

The embodiments described above are just preferable embodiments of the present invention, and are not indented to limit the protection scope of the present invention. Any modifications, alternatives, improvements or the like within the spirit and principle of the present invention are included in the protection scope of the present invention.

What is claimed is:

1. A gait recognition method, characterized in that the method comprises:
   S11: extracting an initial gait feature of a gait video of a person to be recognized;
   S12: obtaining a corresponding optimized gait feature according to a trained sub neural network and the initial gait feature;
   S13: determining corresponding degrees of similarity according to the optimized gait feature of the person to be recognized and the optimized gait feature of each known person in a matching library, and determining information of the person to be recognized according to information of the known person in the matching library corresponding to the optimized gait feature which has the highest degree of similarity with the optimized gait feature of the person to be recognized;
   wherein, the trained sub neural network is obtained by:
   S21: for each known person, obtaining an initial gait feature of a gait video of the person;
   S22: constructing a sample pair set, which comprises a first sample pair group and a second sample pair group, wherein each sample pair of the first sample pair group includes two initial gait features of a same person and each sample pair of the second sample pair group includes two initial gait features of different persons;
   S23: training a neural network comprising two identical sub neural networks which are provided in parallel and share weight according to the first sample pair group and the second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group.

2. The method according to claim 1, characterized in that the determining information of the person to be recognized according to information of the known person in the matching library corresponding to the optimized gait feature which has the highest degree of similarity with the optimized gait feature of the person to be recognized comprises:

with the highest degree of similarity, judging whether the highest degree of similarity is greater than a preset threshold of the degree of similarity, and if so, determining the information of the known person in the matching library corresponding to the optimized gait feature which has the highest degree of similarity with the optimized gait feature of the person to be recognized as the information of the person to be recognized.

3. The method according to claim 1, characterized in that the outputs of the two sub neural networks for all the sample pairs converge to a contrastive loss layer;

each sub neural network is trained according to a contrastive loss function set for the contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group.

4. The method according to claim 2, characterized in that the outputs of the two sub neural networks for all the sample pairs converge to a contrastive loss layer;

each sub neural network is trained according to a contrastive loss function set for the contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group.

5. The method according to claim 3, characterized in that, the contrastive loss function is:

$$\mathcal{L}(W) = \Sigma_{i=1}^{P} L(W, (y, X_1, X_2)^i)$$

wherein, $$L(W, (y, X_1, X_2)^i) = (1-y) \cdot \max(m - E_W(X_1, X_2)^i, 0) + y \cdot E_W(X_1, X_2)^i E_W(X_1, X_2) = \|S_W(X_1) - S_W(X_2)\|_2^2$$

i represents the ith sample pair, $X_1$, $X_2$ are two initial gait features in a sample pair respectively; when the ith sample pair belongs to the first sample pair group, y equals to 1; when the ith sample pair belongs to the second sample pair group, y equals to 0; P is the total number of the sample pairs, W is a model parameter of the sub neural network, m is a boundary threshold which is set to be greater than 0, $S_W(X_1), S_W(X_2)$ are optimized gait features corresponding to the initial gait features $X_1$, $X_2$.

6. The method according to claim 4, characterized in that, the contrastive loss function is:

$$\mathcal{L}(W) = \Sigma_{i=1}^{P} L(W, (y, X_1, X_2)^i)$$

wherein, $$L(W, (y, X_1, X_2)^i) = (1-y) \cdot \max(m - E_W(X_1, X_2)^i, 0) + y \cdot E_W(X_1, X_2)^i E_W(X_1, X_2) = \|S_W(X_1) - S_W(X_2)\|_2^2$$

i represents the ith sample pair, $X_1$, $X_2$ are two initial gait features in a sample pair respectively; when the ith sample pair belongs to the first sample pair group, y equals to 1; when the ith sample pair belongs to the second sample pair group, y equals to 0; P is the total number of the sample pairs, W is a model parameter of the sub neural network, m is a boundary threshold which is set to be greater than 0, $S_W(X_1), S_W(X_2)$ are optimized gait features corresponding to the initial gait features $X_1$, $X_2$.

7. The method according to claim 1, characterized in that the sub neural network is a 3D convolutional neural network.

8. The method according to claim 7, characterized in that the extracting an initial gait feature of a gait video of a person to be recognized comprises:

for an image sequence of the gait video, extracting a foreground silhouette image sequence using a Graph Cut image segmentation method;

normalizing sizes of images in the foreground silhouette image sequence and using the normalized foreground silhouette image sequence as the initial gait feature.

9. The method according to claim 1, characterized in that the number of the sample pairs comprised in the first sample pair group is equal to that of the sample pairs comprised in the second sample pair group.

10. A gait recognition device, characterized in that the device comprises:

an extracting module used to extract an initial gait feature of a gait video of a person to be recognized;

a generating module used to obtain a corresponding optimized gait feature according to a trained sub neural network and the initial gait feature;

a recognizing module used to determine corresponding degrees of similarity according to the optimized gait feature of the person to be recognized and the optimized gait feature of each known person in a matching library, and to determine information of the person to be recognized according to information of the known person in the matching library corresponding to the optimized gait feature which has the highest degree of similarity with the optimized gait feature of the person to be recognized;

the device further comprises:

a training module used to obtain an initial gait feature of a gait video of each known person; to construct a sample pair set, which comprises a first sample pair group and a second sample pair group, wherein each sample pair of the first sample pair group includes two initial gait features of a same person and each sample pair of the second sample pair group includes two initial gait features of different persons; and to train a neural network comprising two identical sub neural networks which are provided in parallel and share weight according to the first sample pair group and the second sample pair group, such that the degree of similarity between two optimized gait features output by the two sub neural networks for any sample pair in the first sample pair group is greater than the degree of similarity between two optimized gait features output by the two sub neural networks for any sample pair in the second sample pair group.

11. The device according to claim 10, characterized in that the recognizing module is used to judge whether the highest degree of similarity is greater than a preset threshold of the degree of similarity, and if so, to determine the information of the known person in the matching library corresponding to the optimized gait feature which has the highest degree of similarity with the optimized gait feature of the person to be recognized as the information of the person to be recognized.

12. The device according to claim 10, characterized in that the training module is used to train each sub neural network according to a contrastive loss function set for a contrastive loss layer, such that the degree of similarity between two optimized gait features output by the two sub neural networks for any sample pair in the first sample pair group is greater than the degree of similarity between two optimized gait features output by the two sub neural networks for any sample pair in the second sample pair group, the contrastive loss function is:

$$\mathcal{L}(W) = \sum_{i=1}^{P} L(W, (y, X_1, X_2)^i)$$

wherein, $$L(W,(y,X_1,X_2)^i) = (1-y) \cdot \max(m - E_W(X_1,X_2)^i, 0) + y \cdot E_W(X_1,X_2)^i E_W(X_1,X_2) = \|S_W(X_1) - S_W(X_2)\|_2^2$$

i represents the ith sample pair, $X_1$, $X_2$ are two initial gait feature in a sample pair respectively; when the ith sample pair belongs to the first sample pair group, y equals to 1; when the ith sample pair belongs to the second sample pair group, y equals to 0; P is the total number of the sample pairs, W is a model parameter of the sub neural network, m is a boundary threshold which is set to be greater than 0, $S_W(X_1), S_W(X_2)$ are optimized gait features corresponding to the initial gait features $X_1$, $X_2$.

* * * * *